UNITED STATES PATENT OFFICE.

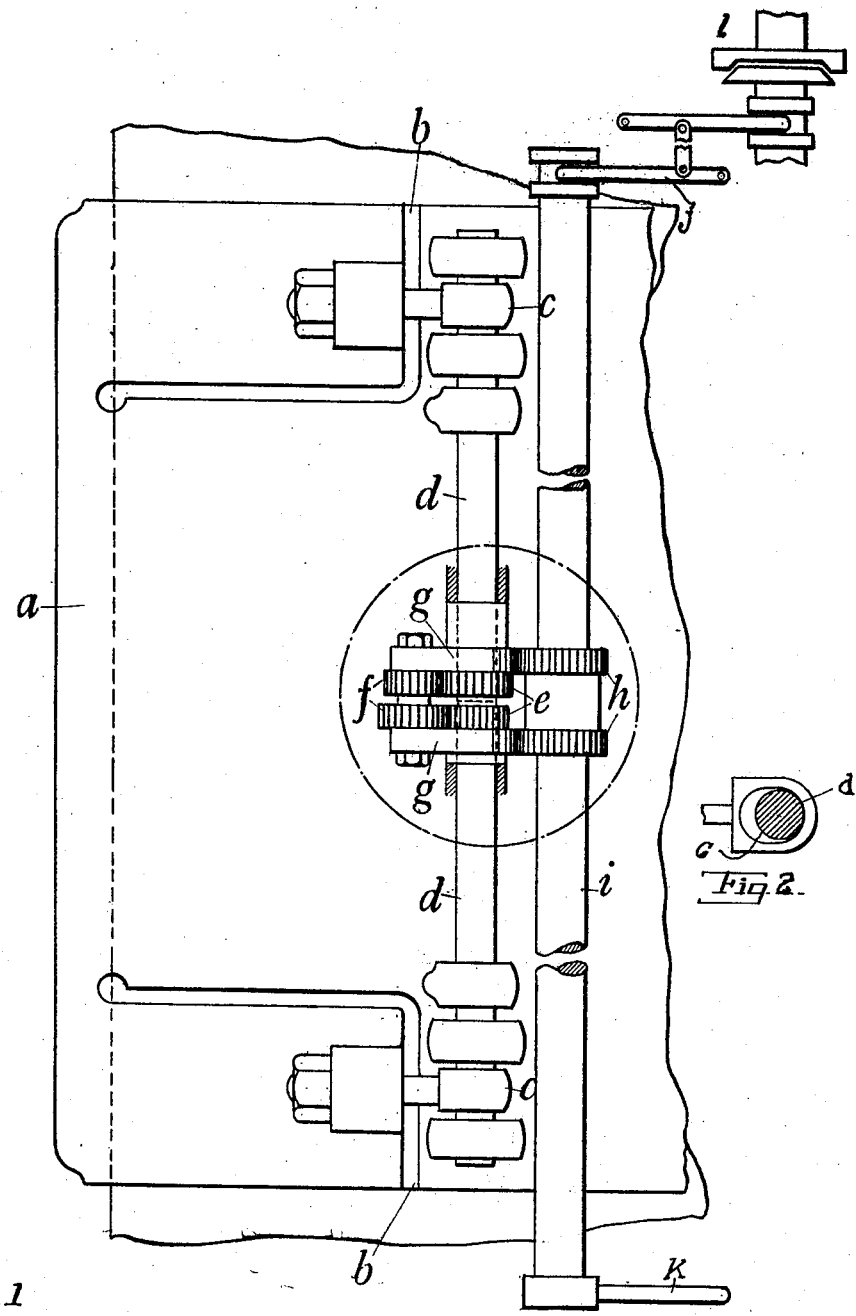

FRED COXON, OF BIRMINGHAM, ENGLAND, ASSIGNOR TO JAMES ARCHDALE & COMPANY, LIMITED, OF BIRMINGHAM, ENGLAND.

RADIAL-ARM DRILLING-MACHINE.

1,323,158. Specification of Letters Patent. Patented Nov. 25, 1919.

Application filed October 17, 1917. Serial No. 197,093.

*To all whom it may concern:*

Be it known that I, FRED COXON, a subject of the King of Great Britain and Ireland, residing at Manchester Works, Ledsam street, in the city of Birmingham, England, have invented certain new and useful Improvements Relating to Radial-Arm Drilling-Machines, of which the following is a specification.

This invention relates to radial arm drilling machines and has for its object to provide improved means for actuating the arm locking mechanism and also the clutch of the mechanism whereby the arm is raised or lowered.

The invention comprises the employment of a hand operated shaft connected to both the locking mechanism and the clutch, the arrangement being such that a longitudinal movement of the shaft actuates the clutch and a rotational movement the locking mechanism.

In the accompanying drawing Figure 1 illustrates diagrammatically a device constructed in accordance with this invention, and Fig. 2 is a sectional view of one shaft showing the cam thereon.

In applying the invention as shown to a machine in which the radial arm slides upon a vertical cylindrical pillar, the sleeve $a$ which embraces the pillar is divided as heretofore at two positions $b$ so that it can be contracted on the pillar. For effecting this movement a known cam device $c$ is provided at each division, each cam being mounted on its own shaft $d$. The two shafts are in alinement and the adjacent ends are connected by an epicyclic mechanism. Such mechanism comprises sun pinions $e$ secured to the shafts, and planet pinions $f$ on a spindle which is carried by arms $g$. The pinions $i$ are of slightly different diameters as are also the pinions $f$. The pinions $f$ are secured together or formed integrally in the same piece of metal. Each of the arms $g$ is free on its shaft and is formed as a toothed sector at one end and is actuated from a double pinion $h$ through which can slide a shaft $i$ which is featherkeyed to the pinion. At one end the shaft is connected to a lever $j$ which actuates a clutch $l$ in conjunction with the automatic raising and lowering mechanism of the arm. On the other end a hand lever $k$ is provided for actuating the shaft. In conjunction with the lever or any other convenient part of the shaft or of the mechanisms associated with it, suitable provision is made for preventing actuation of the shaft before the arm is unlocked, or locking of the arm before the clutch is put out of action. Rotation of the shaft operates the locking mechanism without affecting the clutch, and endwise movement of the shaft operates the clutch without affecting the locking mechanism.

The invention is not limited to machines of the cylindrical pillar type, nor to clamping mechanism comprising epicylic wheels, and the details may be varied to meet different requirements.

Having thus described my invention what I claim as new and desire to secure by Letters Patent is:—

1. In radial arm drilling machines, means for actuating the arm locking mechanism and also the clutch of the mechanism whereby the arm is raised or lowered, said means consisting in part of a hand operated shaft which can both slide and rotate, the sliding movement being utilized to actuate one locking mechanism and the rotational movement the other, substantially as described.

2. In means for actuating the arm locking mechanism of a radial arm drilling machine and also the clutch of the mechanism whereby the arm is raised or lowered, the combination comprising a slidable and rotatable hand operated shaft, a pair of shafts in alinement and parallel with the first shaft, a sector arm on each of the second shafts, planet pinions carried between the arms, a sun pinion on each of the second shafts gearing with a planet pinion, a pinion on the first shaft gearing with the sector arms, means for communicating the rotational movement of the second shafts derived from the first shaft to the arm locking mechanism, and means for communicating the sliding movement of the first shaft to the clutch mechanism, substantially as described.

3. In radial arm drilling machines, the combination comprising a pillar, a sleeve movable on the pillar, and divided at two positions, cam locking mechanism at each division, a pair of rotatable cam actuating shafts mounted in alinement, a hand operated shaft parallel to the cam actuating shafts, said hand operated shaft being slidable and rotatable, a sector arm on each cam shaft, planet pinions carried between the said arms, a sun pinion on each cam shaft, a pinion on the hand operated shaft gearing with the sector arms, means for rotating and sliding the hand operated shaft and for transmitting the sliding movement to a clutch for starting or stopping an arm raising and lowering mechanism, substantially as described.

In testimony whereof I have signed my name to this specification.

FRED COXON.